C. L. WALL.
BLADE HARROW.
APPLICATION FILED MAY 4, 1911.
1,018,281.
Patented Feb. 20, 1912.
2 SHEETS—SHEET 2.
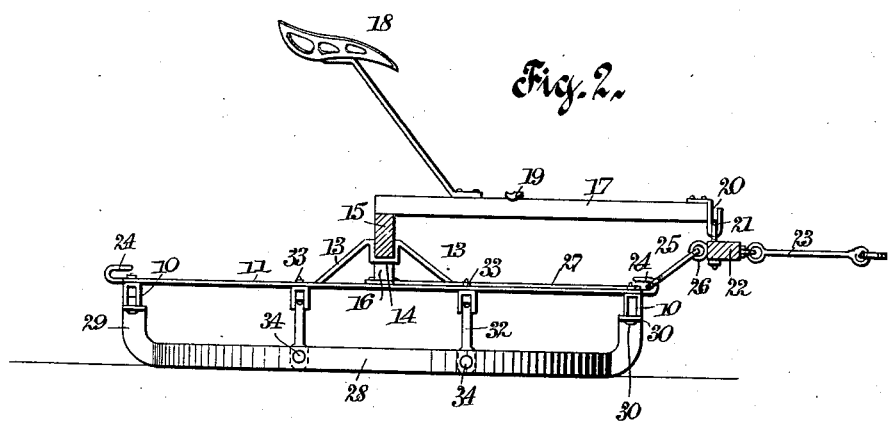
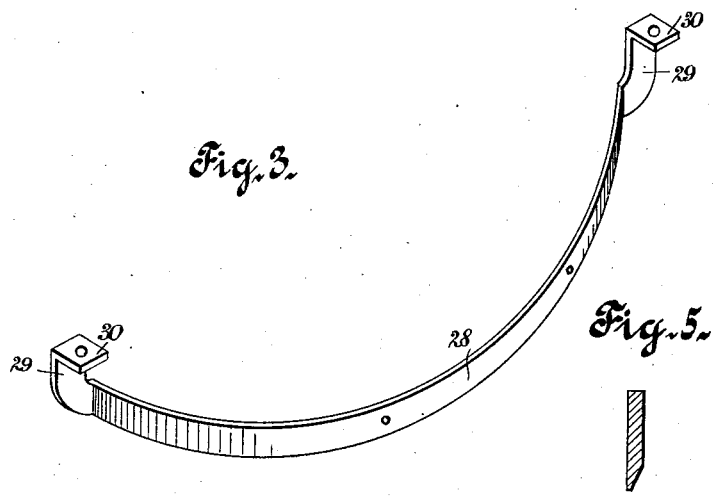
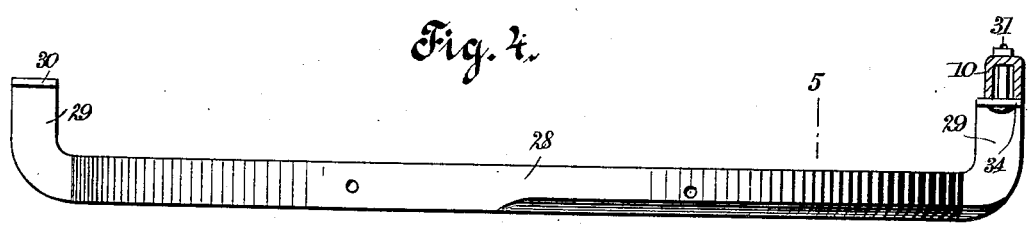
WITNESSES
INVENTOR
Charles L. Wall
BY Munn & Co.
ATTORNEYS

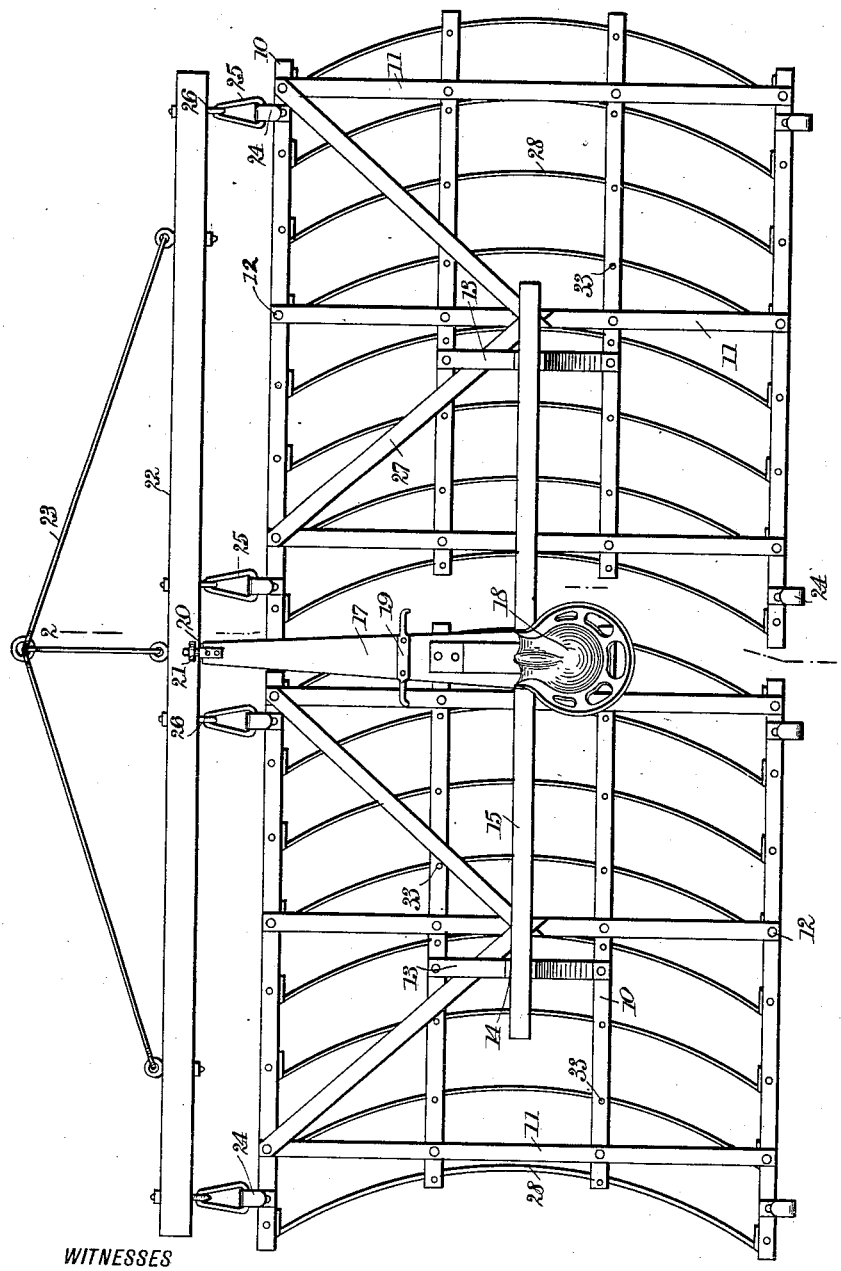

UNITED STATES PATENT OFFICE.

CHARLES L. WALL, OF LAWRENCE, KANSAS.

BLADE-HARROW.

1,018,281. Specification of Letters Patent. Patented Feb. 20, 1912.

Application filed May 4, 1911. Serial No. 624,924.

*To all whom it may concern:*

Be it known that I, CHARLES L. WALL, a citizen of the United States, and a resident of Lawrence, in the county of Douglas and State of Kansas, have invented a new and Improved Blade-Harrow, of which the following is a full, clear, and exact description.

This invention relates to blade-harrows, and has reference more particularly to a device of this class in which each of the blades is curved along substantially its entire length.

An object of the invention is to provide a simple and durable harrow which can be inexpensively manufactured, which is light in weight, which will not readily wear out, by means of which the ground can be thoroughly prepared for planting, which can be used in cultivating, for example in cultivating listed corn, and which will suitably level the ground and break up clods or lumps of earth.

A further object of the invention is to provide a device of the class described, which can be drawn along the ground without undue effort, in which the dirt is thoroughly pulverized, which does not tend to gather and carry with it trash or the like upon the ground, and in which the dirt is pulverized by being rolled from one blade toward the adjacent blade.

The invention consists in the construction and combination of parts to be more fully described hereinafter and particularly set forth in the claim.

Reference is to be had to the accompanying drawings forming a part of this specification, in which similar characters of reference indicate corresponding parts in all the views, and in which—

Figure 1 is a plan view of an embodiment of my invention; Fig. 2 is a longitudinal section on line 2—2 of Fig. 1; Fig. 3 is a perspective view of one of the harrow blades; Fig. 4 is a side elevation of the blade; and Fig. 5 is an enlarged cross section on the line 5—5 of Fig. 4.

Before proceeding to a more detailed explanation of my invention it should be understood that the present form of the harrow is an improvement upon, and modification of the similar device disclosed in my United States Patent No. 963,670, issued July 5, 1910. In the harrow there shown I employ a plurality of blades of V shape. I have since discovered that by using instead, blades of rounded or curved form, as is illustrated herewith, it is possible to obtain a more efficient action of the harrow. I have also found it advantageous to construct the device as will appear more clearly hereinafter, so that it can be reversed, whereby, when one portion of the blade edges becomes worn, another, corresponding part can be used instead, whereby the life of the harrow is materially lengthened.

Certain of the details of construction, shown for example, herewith, form no part of the invention, and can be varied in accordance with individual preference and special conditions, without deviating from the essence of the invention as defined in the appended claims.

Referring more particularly to the drawings, I employ, preferably, two harrow units in a single implement, each unit consisting of a frame having longitudinal bars 10, and fore and aft, or cross bars 11. The bars 10 are of U-cross section, and the bars 11 are preferably flat strips secured by means of bolts 12, to the elements 10. The frame of each section is substantially rectangular and is effectively braced throughout its structure. The sections or units of the harrow are of course similar and symmetrical. Secured upon the intermediate longitudinal bars 10 of each section is a V-shaped, upwardly disposed bracket 13 having at the apex a downwardly offset socket portion 14. A longitudinally extended beam 15 is received in the sockets 14 and has projections 16 constituting stops adapted to engage the brackets 13 to hold the beam against movement in the direction of its length. A forwardly disposed seat support 17 has its rear end bolted or otherwise firmly secured to the beam 15, and carries the seat 18 for the operator. It also has a foot-rest 19, upon which the person resting upon the seat can place his feet. At the forward end, the support 17 has an outwardly disposed hook 20 adapted to receive an eye 21 of a draw bar 22 provided with suitable means 23 for attachment of draft animals. The fore and aft, or the edge bars 10 of the frames are provided with similar hooks 24, each adapted to engage elongated links 25 secured by means of an eyebolt 26 or in any other suitable manner, to the draw bar, so that the latter can be removably attached to the frames. To stiffen the frames of the sections I may use diagonally disposed stiffener bars 27 extending from the ends of the outer transverse bars 11 and secured near the middle of the inner or intermediate bars 11. The frame members may be bolted, riveted or otherwise firmly secured together. The structure described above is substantially similar to the corresponding portions of the harrow disclosed in my United States patent referred to supra.

In the present form of the harrow I employ blades 28 which are of suitable curvature, and may, for example be of circular curvature. The blades are rounded or curved throughout their entire lengths, and each has at its end a laterally bent and upwardly disposed arm 29, at the upper extremity of which is a laterally disposed flange or lug 30. These flanges or lugs 30 are arranged to engage at the under edges of the fore and aft beams 10 and are secured in place by means of bolts 31. To assist in securing the blades to the framework I employ hangers 32 depending from the intermediate, longitudinal bars 10, and having the upper ends secured between the sides of the bars, by means of bolts 33. The hangers have the lower ends enlarged, and secured by means of rivets 34 or the like, to the blades, intermediate their ends.

It will be understood that as the harrow advances along the ground, the forward parts of the blades engage the clods or lumps of dirt and roll or force the clods or lumps laterally toward and into engagement with the adjacent blades, whereby the clods are comminuted. This naturally wears the forward, effective edges of the blades, while the rear edges are little affected. The blades gradually wear away, as indicated in Figs. 4 and 5, and their effectiveness is thereby materially reduced. With this form of harrow, however, the entire blade edge can be used, as the device can very easily be reversed. It is merely necessary to disengage the links 25 and remove the beam 15 from the sockets. The beam is then turned about and the links engaged with the hooks at the other edge beam, and the harrow is again ready for use.

Having thus described my invention, I claim as new, and desire to secure by Letters Patent:

In a device of the class described, a symmetrical, reversible frame comprising longitudinal bars and fore and aft bars secured thereto, and a plurality of harrow blades, each having at the end an upwardly disposed arm rounded with a laterally disposed flange secured to one of the longitudinal bars of said frame, each of said blades being of round curvature throughout its entire length between said arms and having the lower blade edge lying in a horizontal plane.

In testimony whereof I have signed my name to this specification in the presence of two subscribing witnesses.

CHARLES L. WALL.

Witnesses:
 CHAS. DE FOREST,
 L. W. READING.

---

Copies of this patent may be obtained for five cents each, by addressing the "Commissioner of Patents, Washington, D. C."